(12) United States Patent
Fontvielle et al.

(10) Patent No.: US 10,587,856 B1
(45) Date of Patent: Mar. 10, 2020

(54) SPHERICAL VISUAL CONTENT TRANSITIONS

(71) Applicant: GoPro, Inc., San Mateo, CA (US)

(72) Inventors: Adrien Fontvielle, Goncelin (FR); Loïc Martin, Chapareillan (FR); Antoine Meler, Chapareillan (FR)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/685,420

(22) Filed: Aug. 24, 2017

(51) Int. Cl.
| | |
|---|---|
| *H04N 13/111* | (2018.01) |
| *H04N 13/117* | (2018.01) |
| *H04N 5/232* | (2006.01) |
| *G06T 3/60* | (2006.01) |
| *G06T 5/00* | (2006.01) |
| *G06T 5/50* | (2006.01) |
| *G06T 3/00* | (2006.01) |

(52) U.S. Cl.
CPC ....... *H04N 13/117* (2018.05); *H04N 5/23238* (2013.01); *G06T 3/0093* (2013.01); *G06T 3/60* (2013.01); *G06T 5/002* (2013.01); *G06T 5/50* (2013.01)

(58) Field of Classification Search
CPC .............. H04N 13/117; H04N 5/23238; G06T 3/0093; G06T 3/60; G06T 5/002; G06T 5/50
USPC .......................................................... 348/39
See application file for complete search history.

(56) References Cited

U.S. PATENT DOCUMENTS

| 9,972,066 | B1 * | 5/2018 | Gilquin | G06T 3/0031 |
| 10,282,901 | B2 * | 5/2019 | Glover | G06T 19/003 |
| 2014/0098289 | A1 * | 4/2014 | Jang | G11B 27/105 |
| | | | | 348/441 |
| 2016/0065861 | A1 * | 3/2016 | Steinberg | G06K 9/00228 |
| | | | | 348/239 |
| 2016/0086306 | A1 * | 3/2016 | Nishimaki | G06T 3/40 |
| | | | | 345/620 |
| 2017/0278262 | A1 * | 9/2017 | Kawamoto | B64C 39/02 |

* cited by examiner

*Primary Examiner* — James T Boylan
(74) *Attorney, Agent, or Firm* — Esplin & Associates, PC (57) ABSTRACT

First visual information defining first spherical visual content, second visual information defining second spherical visual content, and/or other information may be obtained. Presentation of the first spherical visual content on a display may be effectuated. A spherical transition between the first spherical visual content and the second spherical visual content may be identified. The spherical transition may define a change in presentation of visual content on the display from the first spherical visual content to the second spherical visual content based on a transitional motion within a spherical space and/or other information. A change in presentation of the first spherical visual content on the display to presentation of the second visual content on the display may be effectuated based on the spherical transition and/or other information. The change may be determined based on the transition motion within the spherical space and/or other information.

16 Claims, 9 Drawing Sheets

FIG. 8A view A 850 view E 858 view B 852 view D 856 view C 854

FIG. 8B

SPHERICAL VISUAL CONTENT TRANSITIONS

FIELD

This disclosure relates to transitioning presentation between spherical visual content based on a transition motion within spherical space.

BACKGROUND

Spherical images/videos may provide users with greater flexibility in how content within the images/videos may be viewed than non-spherical images/videos. Transition effects created for non-spherical images/videos may not utilize the viewing capabilities provided by spherical images/videos.

SUMMARY

This disclosure relates to transitioning presentation between spherical visual content. First visual information defining first spherical visual content, second visual information defining second spherical visual content, and/or other information may be obtained. Presentation of the first spherical visual content on a display may be effectuated. A spherical transition between the first spherical visual content and the second spherical visual content may be identified. The spherical transition may define a change in presentation of visual content on the display from the first spherical visual content to the second spherical visual content based on a transitional motion within a spherical space and/or other information. A change in presentation of the first spherical visual content on the display to presentation of the second visual content on the display may be effectuated based on the spherical transition and/or other information. The change may be determined based on the transition motion within the spherical space and/or other information.

A system that transitions presentation between spherical visual content may include one or more of electronic storage, display, processor, and/or other components. The display may be configured to present visual content and/or other information. The electronic storage may store visual information defining spherical visual content, and/or other information. Visual content may refer to media content that may be consumed as one or more image, one or more videos and/or other visual presentations. Spherical image content may define visual content viewable from a point of view. Spherical video content may define visual content viewable from a point of view as a function of progress through the spherical video content. In some implementations, spherical visual content may include spherical virtual reality visual content.

The processor(s) may be configured by machine-readable instructions. Executing the machine-readable instructions may cause the processor(s) to facilitate transitioning presentation between spherical visual content. The machine-readable instructions may include one or more computer program components. The computer program components may include one or more of a visual information component, a presentation component, an identification component, a spherical transition component, and/or other computer program components. The visual information component may be configured to obtain visual information defining one or more spherical visual content and/or other information. For example, the visual information component may obtain first visual information defining first spherical visual content, second visual information defining second spherical visual content, and/or other information. The visual information component may obtain visual information from one or more storage locations. The visual information component may be configured to obtain visual information defining one or more visual content during acquisition of the visual content/visual information and/or after acquisition of the visual content/video information by one or more image sensors.

The presentation component may be configured to effectuate presentation of visual content on the display. For example, the presentation component may effectuate presentation of first spherical visual content, second spherical visual content, and/or other information on the display. In some implementations, an extent of the visual content presented on the display may be determined based on a display field of view and/or other information.

The identification component may be configured to identify a spherical transition between the first spherical visual content and the second spherical visual content. In some implementations, the spherical transition may be identified based on a director track including the spherical transition and/or other information. In some implementations, the spherical transition may be identified based on a user selection of the spherical transition and/or other information.

The spherical transition may define a change in presentation of visual content on the display from the first spherical visual content to the second spherical visual content based on a transition motion within a spherical space and/or other information. In some implementations, the transition motion within the spherical space may include a rotation of the first spherical visual content and/or the second spherical visual content within the spherical space. In some implementations, the transition motion within the spherical space may include a motion of a transition plane within the spherical space. The transition plane may separate the presentation of the first spherical visual content and the second spherical visual content on the display. In some implementations, a blurring effect and/or other effects may accompany the motion of the transition plane within the spherical space.

In some implementations, the transition motion within the spherical space may include a change in projection. In some implementations, the translation motion within the spherical space may include one or more swirling warps. A swirling warp may blend the presentation of the first spherical visual content and the second spherical visual content on the display.

The spherical transition component may be configured to effectuate a change in the presentation of the first spherical visual content on the display to presentation of the second spherical visual content on the display based on the spherical transition and/or other information. The change may be determined based on the transition motion within the spherical space and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
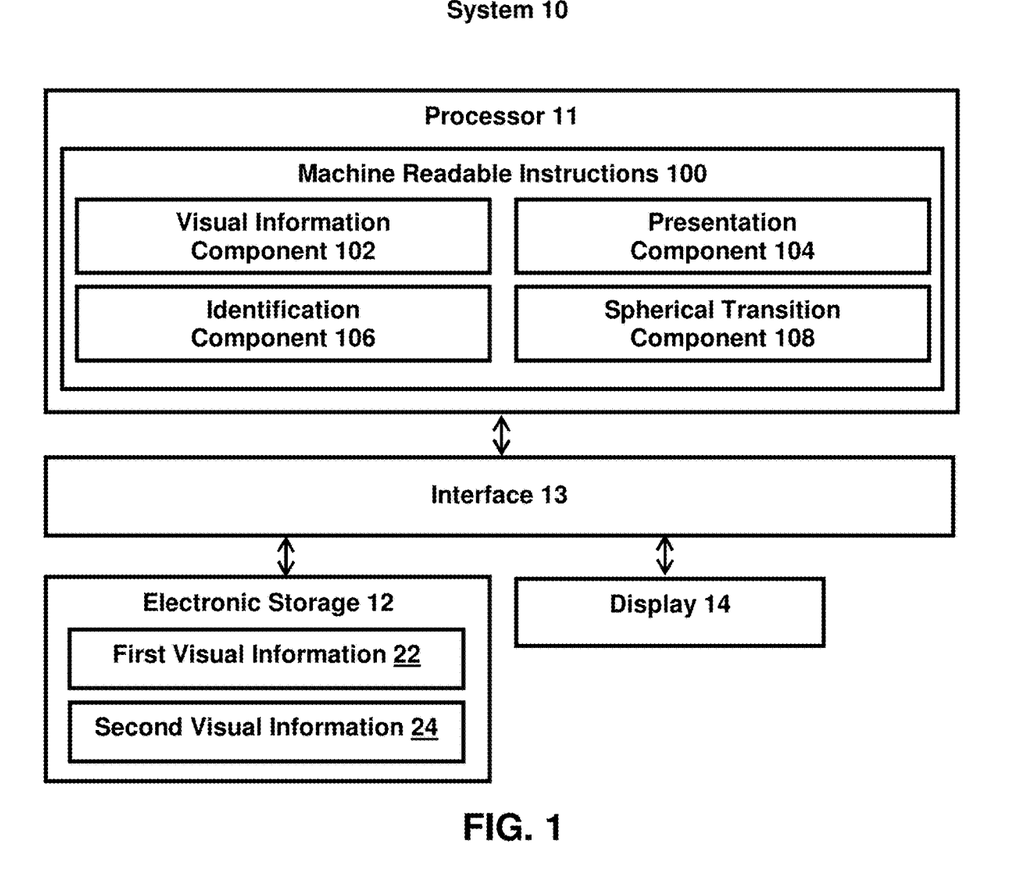
FIG. 1 illustrates a system that transitions presentation between spherical visual content.

FIG. 1 illustrates a system 10 that transitions presentation between spherical visual content. The system 10 may include one or more of a processor 11, an electronic storage 12, an interface 13 (e.g., bus, wireless interface), a display 14, and/or other components. First visual information 22 defining first spherical visual content, second visual information 24 defining second spherical visual content, and/or other information may be obtained by the processor 11. Presentation of the first spherical visual content on the display 14 may be effectuated by the processor 11. A spherical transition between the first spherical visual content and the second spherical visual content may be identified by the processor 11. The spherical transition may define a change in presentation of visual content on the display 14 from the first spherical visual content to the second spherical visual content based on a transitional motion within a spherical space and/or other information. A change in presentation of the first spherical visual content on the display 14 to presentation of the second visual content on the display 14 may be effectuated by the processor 11 based on the spherical transition and/or other information. The change may be determined based on the transition motion within the spherical space and/or other information.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to visual information, visual content, spherical transition, transition between visual content, presentation of visual content, and/or other information.

The electronic storage 12 may store visual information defining one or more visual content. For example, the electronic storage 12 may store first visual information 22 defining first visual content, second visual information 24 defining second visual content, and/or other visual information defining other visual content.

Visual content may refer to media content that may be consumed as one or more image, one or more videos, and/or other visual presentations. Visual content may include one or more images/videos stored in one or more formats/container, and/or other visual content. A format may refer to one or more ways in which the information defining visual content is arranged/laid out (e.g., file format). A container may refer to one or more ways in which information defining visual content is arranged/laid out in association with other information (e.g., wrapper format).

Image/video content may include an image/video clip captured by an image/video capture device, multiple images/video clips captured by an image/video capture device, and/or multiple images/video clips captured by separate image/video capture devices. Image/video content may include multiple images/video clips captured at the same time and/or multiple images/video clips captured at different times. Image/video content may include an image/video clip processed by an image/video application, multiple images/video clips processed by an image/video application and/or multiple images/video clips processed by separate image/video applications.

Video content may include visual content viewable as a function of progress through the video content. Video content may include audio content playable as a function of progress through the video content. Video content may have a progress length. A progress length may be defined in terms of time durations and/or frame numbers. For example, video content may include a video having a time duration of 60 seconds. Video content may include a video having 1800 video frames. Video content having 1800 video frames may have a play time duration of 60 seconds when viewed at 30 frames/second. Other time durations and frame numbers are contemplated.

Visual content may include spherical visual content (e.g., spherical image content, spherical video content), spherical virtual reality visual content, and/or other visual content. Spherical image content/spherical visual reality content may define visual content viewable from a point of view (e.g., center of sphere/spherical space). Spherical video content/spherical visual reality content may define visual content viewable from a point of view as a function of progress (defined in terms of (play) duration and/or frame numbers) through the spherical video content.

Spherical visual content may refer to an image/video capture of multiple views from one or more locations. Spherical image/video content may include a full spherical image/video capture (360 degrees of capture) or a partial spherical image/video capture (less than 360 degrees of capture). Spherical visual content may be captured through the use of one or more cameras/image sensors to capture images/videos from a location. Multiple images/videos may be stitched together to form the spherical visual content. Spherical visual content may include capture of computer-generated objects, such as two-dimensional or three dimensional computer-generated objects, visual overlays, and/or other computer-generated objects.

Virtual reality content may refer to content that may be consumed via virtual reality experience. Virtual reality content may associate different directions within the virtual reality content with different viewing directions, and a user may view a particular directions within the virtual reality content by looking in a particular direction. For example, a user may use a virtual reality headset to change the user's direction of view. The user's direction of view may correspond to a particular direction of view within the virtual reality content. For example, a forward looking direction of view for a user may correspond to a forward direction of view within the virtual reality content.

Visual content and/or virtual reality content may have been captured at one or more locations. For example, visual content and/or virtual reality content may have been captured from a stationary position (e.g., a seat in a stadium). Visual content and/or virtual reality content may have been captured from a moving position (e.g., a moving bike). For example, visual content and/or virtual reality content may include visual capture from a path taken by the capturing device(s) in the moving position. For example, visual content and/or virtual reality content may include image/video capture from a person walking around in a music festival.

Referring to FIG. 1, the display 14 may be configured to present visual content (e.g., image(s), video(s)) and/or other information. In some implementations, the display 14 may include a touchscreen display configured to receive user input indicating the user's viewing selections of the video content. For example, the display 14 may include a touchscreen display of a mobile device (e.g., camera, smartphone, tablet, laptop).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate transitioning presentation between visual content (e.g., spherical visual content, virtual reality content). The machine readable instructions 100 may include one or more computer program components. The machine readable instructions 100 may include one or more of a visual information component 102, a presentation component 104, an identification component 106, a spherical transition component 108, and/or other computer program components.

The visual information component 102 may be configured to obtain visual information defining one or more visual content and/or other information. Obtaining the visual information may include one or more of accessing, acquiring, analyzing, determining, examining, locating, receiving, retrieving, reviewing, storing, and/or otherwise obtaining the visual information. The visual information component 102 may obtain visual information from one or more storage locations. A storage location may include electronic storage 12, electronic storage of one or more image sensors (not shown in FIG. 1), electronic storage of a device accessible via a network, and/or other locations. For example, the visual information component 102 may obtain first visual information 22 defining first spherical visual content, second visual information 24 defining second spherical visual content, other visual information defining other visual content, and/or other information stored in the electronic storage 12.

The visual information component 102 may be configured to obtain visual information defining one or more visual content during acquisition of the visual information and/or after acquisition of the visual information by one or more image sensors. For example, the visual information component 102 may obtain visual information defining an image/video while the image/video is being captured by one or more image sensors. The visual information component 102 may obtain visual information defining an image/video after the image/video has been captured and stored in memory (e.g., the electronic storage 12).

Figure 3:
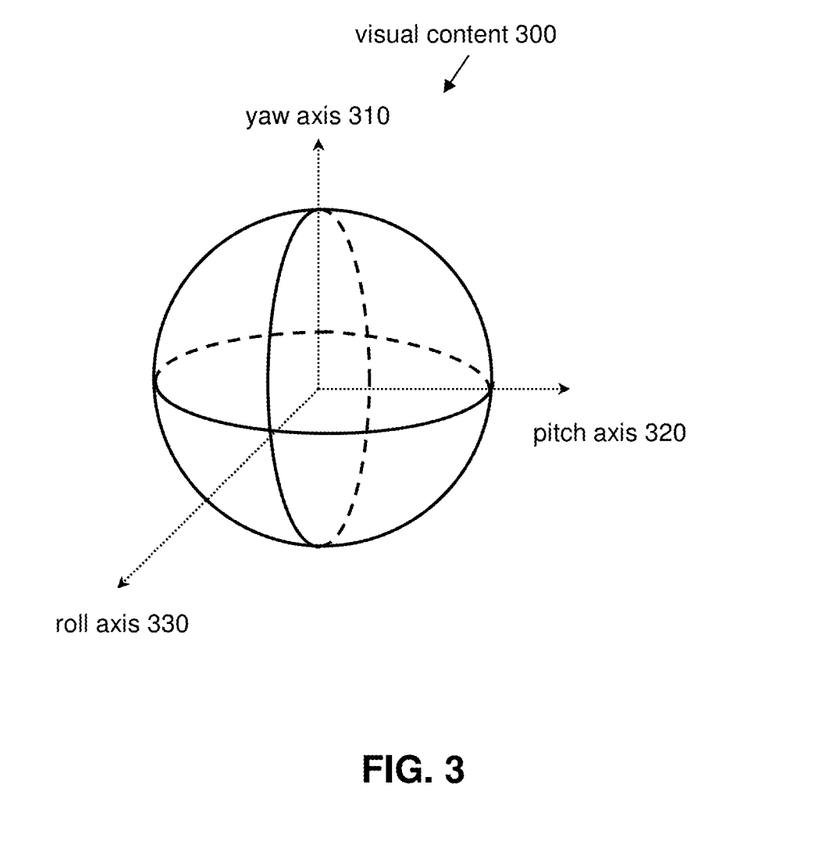
FIG. 3 illustrates an example spherical visual content.

FIG. 3 illustrates an example visual content 300 defined by visual information. The visual content 300 may include spherical visual content. In some implementations, spherical visual content may be stored with a 5.2K resolution. Using a 5.2K spherical visual content may enable viewing windows for a portion of the spherical visual content with resolution close to 1080p. FIG. 3 illustrates example rotational axes for the visual content 300. Rotational axes for the visual content 300 may include a yaw axis 310, a pitch axis 320, a roll axis 330, and/or other axes. Rotations about one or more of the yaw axis 310, the pitch axis 320, the roll axis 330, and/or other axes may define viewing directions/display fields of view (e.g., extents of the visual content 300 presented on the display 14) for the visual content 300.

For example, a 0-degree rotation of the visual content 300 around the yaw axis 310 may correspond to a front viewing direction. A 90-degree rotation of the visual content 300 around the yaw axis 310 may correspond to a right viewing direction. A 180-degree rotation of the visual content 300 around the yaw axis 310 may correspond to a back viewing direction. A −90-degree rotation of the visual content 300 around the yaw axis 310 may correspond to a left viewing direction.

A 0-degree rotation of the visual content 300 around the pitch axis 320 may correspond to a viewing direction that is level with respect to horizon. A 45-degree rotation of the visual content 300 around the pitch axis 320 may correspond to a viewing direction that is pitched up with respect to horizon by 45-degrees. A 90 degree rotation of the visual content 300 around the pitch axis 320 may correspond to a viewing direction that is pitched up with respect to horizon by 90-degrees (looking up). A −45-degree rotation of the visual content 300 around the pitch axis 320 may correspond to a viewing direction that is pitched down with respect to horizon by 45-degrees. A −90 degree rotation of the visual content 300 around the pitch axis 320 may correspond to a viewing direction that is pitched down with respect to horizon by 90-degrees (looking down).

A 0-degree rotation of the visual content 300 around the roll axis 330 may correspond to a viewing direction that is upright. A 90 degree rotation of the visual content 300 around the roll axis 330 may correspond to a viewing direction that is rotated to the right by 90 degrees. A −90-degree rotation of the visual content 300 around the roll axis 330 may correspond to a viewing direction that is rotated to the left by 90-degrees. Other rotations and viewing directions are contemplated.

Figure 4A:
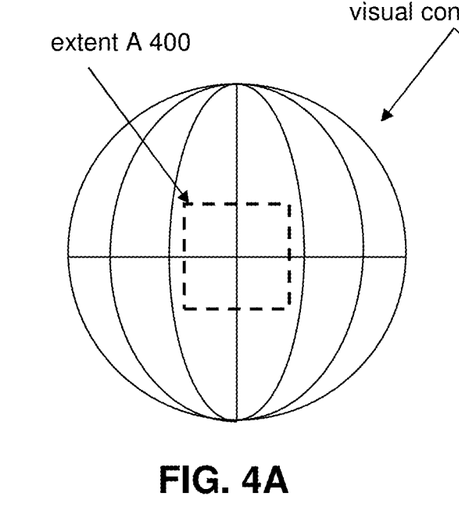
FIGS. 4A-4B illustrate example extents of spherical visual content.
Figure 4B:
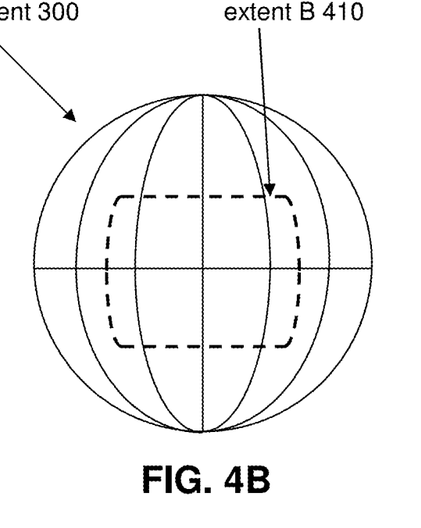

The presentation component 104 may be configured to effectuate presentation of visual content on the display 14. For example, the presentation component 104 may effectuate presentation of the first spherical visual content, the second spherical visual content, other visual content, and/or other information on the display 14. In some implementations, the extent of the visual content presented on the display 14 may be determined based on a display field of view and/or other information. A display field of view may define extent of visual content viewable on the display 14. For example, FIGS. 4A-4B illustrate examples of extents of the visual content 300 presented on the display 14. In FIG. 4A, the size of the viewable extent of the visual content 300 may correspond to the size of extent A 400. In FIG. 4B, the size of viewable extent of the visual content 300 may correspond to the size of extent B 410. Viewable extent of the visual content 300 in FIG. 4A may be smaller than viewable extent of the visual content 300 in FIG. 4B. The difference in sizes of the viewable extents in FIGS. 4A and 4B may be due to difference in viewing angle (e.g., viewing zoom) selected for the visual content 300. The positions of the viewable extents of the visual content 300 may be changed (e.g., via panning the display field of view, via rotation of the visual content 300 within spherical space). In some implementations, the display field of view may include the entirety of the visual content 300.

In some implementations, a display field of view may be determined based on the user's viewing selections (e.g., viewing direction and/or viewing angle determined based on user's interaction with the display 14 and/or other input device(s) coupled to the processor 11 and/or the display 14) and/or other information. Such changes in the display field of view may enable user navigation of the visual content during presentation of the visual content on the display 14 (e.g., during transition between the first spherical visual content and the second spherical visual content). In some implementations, a display field of view may be determined based on instructions for presenting the visual content (e.g., a director track). For example, one or more files may define a director track, which includes instructions for how (e.g., which viewing direction, viewing angle, visual effects to use) the visual content may be presented. For example, a director track for image content may define/identify at what viewing direction and/or viewing angle the image content should be displayed, and/or with what visual transformations (e.g., changes in projection, changes in color/brightness/contrast, warping, blurring, sharpening, additional/removal of visual elements) the image content should be displayed. A director track for video content may define/identify at what viewing direction and/or viewing angle the video content should be displayed as a function of progress through the video content, and/or with what visual transformations the video content should be displayed as a function of progress through the video content.

In some implementations, presentation of one visual content on the display 14 may cause change in presentation position in the progress length of another visual content. Presentation position may indicate where in the progress length of the video content may be presented on the display 14. For example, responsive to the presentation of a first spherical video content (having a first progress length) on the display 14, the presentation position for a second spherical video content may be changed. Such may effectuate playing of both the first spherical video content and the second spherical video content, with the first spherical video content being presented on the display 14. When the presentation of the visual content on the display 14 changes from presentation of the first spherical video content to presentation of the second spherical video content, the portion of the second spherical video content presented may be aligned in terms of progress through the progress lengths of the video content. For example, if the transition between the first spherical video content and the second spherical video content occurs after the first spherical video content has been "played" for ten seconds, the transition may display the portion of the second spherical video content from the ten second mark of the second spherical video content.

The identification component 106 may be configured to identify one or more spherical transitions between visual content. For example, the identification component 106 may be configured to identify a spherical transition between the first spherical visual content and the second spherical visual content. In some implementations, a spherical transition may be identified based on a director track including the spherical transition and/or other information. For example, one or more files including instructions for how the first spherical visual content and/or the second spherical visual content may be presented may define/identity one or more particular spherical transition to be used in transitioning presentation between the visual content.

In some implementations, a spherical transition may be identified based on a user selection of the spherical transition and/or other information. For example, one or more spherical transitions may be identified based on user's interaction with the display 14 and/or other input device(s) coupled to the processor 11 and/or the display 14). The user's selection of the spherical transition may define/identify one or more particular spherical transition to be used in transitioning presentation between the visual content.

In some implementations, one or more spherical transitions may be associated with one of the visual content (e.g., a particular spherical transition is to be used when transition from and/or into a particular spherical visual content) and/or may be associated with both of the visual content (e.g., a particular spherical transition is to be used when transition from a particular spherical video content into another particular spherical visual content). In some implementations, one or more spherical transitions may be associated with one or more portions (portions of visual extents and/or portions of progress length) of visual content. For example, the type of spherical transition may depend on the display field of view into the first spherical visual content and/or the second spherical visual content (e.g., based on which portions of the visual extents are being displayed when the transition occurs) and/or may depend on the progress through the first spherical visual content and/or the second spherical visual content (e.g., based on where in the progress length of the visual content the transition is taking place).

A spherical transition may define one or more changes in presentation of visual content on the display 14 from one visual content to another based on a transition motion within spherical space and/or other information. For example, a spherical transition may define one or more changes in presentation of visual content on the display 14 from the first spherical visual content to the second spherical visual content based on a transition motion within the spherical space and/or other information. A transition motion within the spherical space may refer to one or more motions that takes into account the dimensionality of the spherical space. A transition motion may be limited to one or more given dimensions within the spherical space and/or may include motion within all dimensions of the spherical space. For example, a transition motion within the spherical space may include motion of the spherical space (e.g., movement, rotation, warping of the spherical space), motion of visual content within the spherical space, motion within the visual content within the spherical space, motion of other objects with the spherical space/visual content within the spherical space, and/or other motion based on dimensionality of the spherical space.

In some implementations, a spherical transition may simulate one or more changes in capturing of the visual content. For example, a spherical transition may simulate the visual content being captured by a virtual camera that with one or more parameters different from the camera that actually captured the visual content. For example, a spherical transition may simulate changes in focal length, projection (e.g., change to little planet view/tunnel view, mobius transformation, projection transformation), lens curvature, shutter speed, capture direction/motion (e.g., simulating camera being panned during visual content capture), and/or other parameters that affect how visual content is captured. A spherical transition may include visual effects used for non-spherical transitions, such color/brightness/contrast effects, warping effects, blurring effects, sharpening effects, additional/removal of visual elements, and/or other visual effects. Other types of spherical transitions are contemplated.

Figure 5:
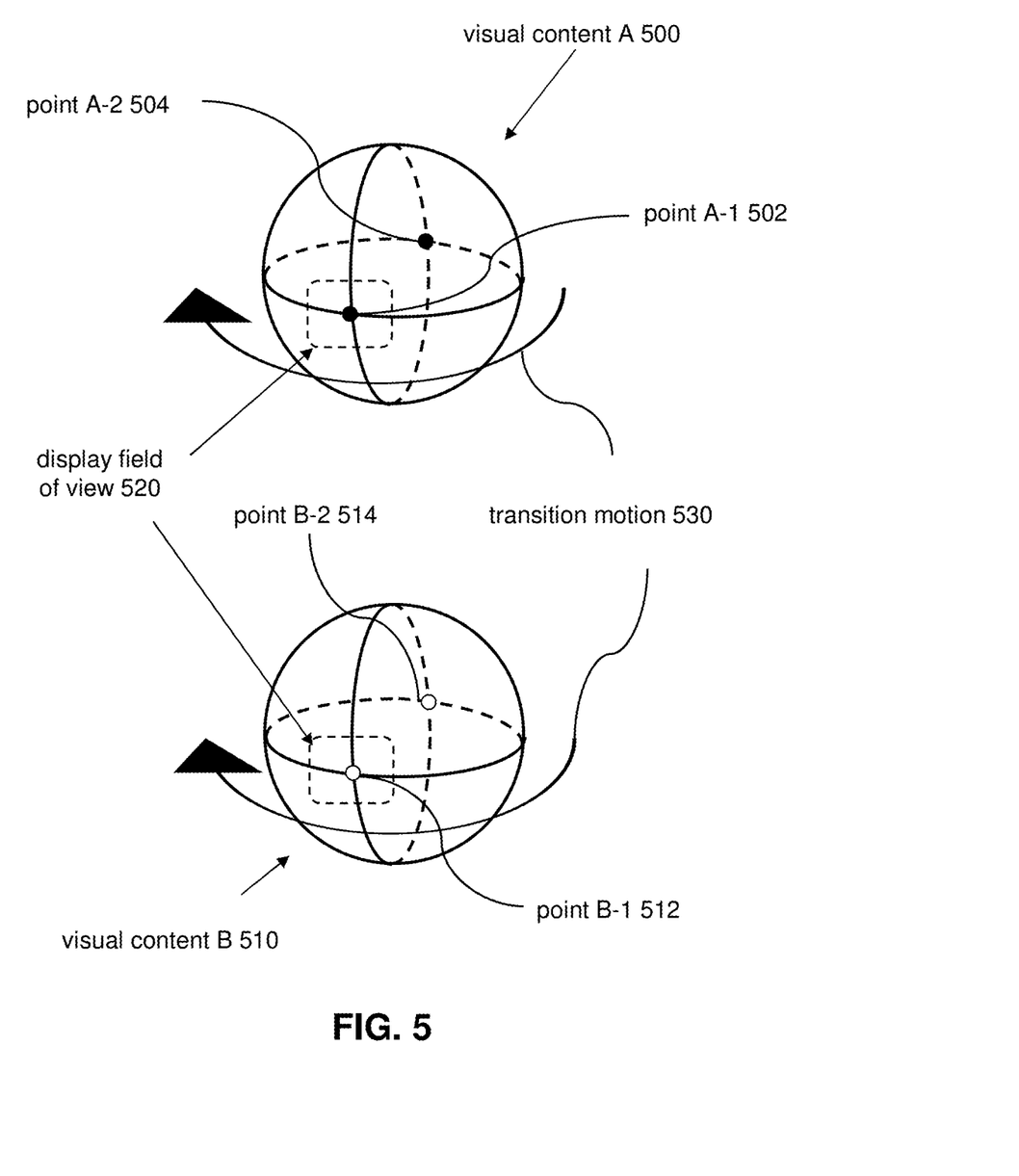
FIG. 5 illustrates an example transition motion.

FIG. 5 illustrates an example transition motion 530 for transitioning presentation between visual content A 500 and visual content B 510. The presentation of visual content on the display 14 may change from the visual content A 500 to the visual content B 510. The extent of the visual content viewable within the visual content A 500 and the visual content B 510 on the display 14 may be defined by a display field of view 520. The change in the presentation of the visual content A 500 on the display 14 to the presentation of the visual content B 510 on the display 14 may be effectuated based on the transition motion 530 within the spherical space. The transition motion 530 within the spherical space may include a rotation of the visual content A 500 and/or the spherical visual content B 510 within the spherical space. The transition motion 530 within the spherical space may include a rotation of the spherical space. The presentation of the visual content on the display 14 may change from the visual content A 500 to the visual content B 510 during the transition motion 530.

For example, the transition motion 530 may include rotation of the visual content A 500 such that the display field of view 520 is centered at point A-1 502 prior to the transition motion 530 and the display field of view 520 is centered at point A-2 504 after the transition motion. The transition motion 530 may include rotation of the visual content B 510 such that the display field of view 520 is centered at point B-1 512 prior to the transition motion 530 and the display field of view 520 is centered at point B-2 514 after the transition motion. Other types of rotations are contemplated. The rotations of different visual content (e.g., the visual content A 500, the visual content B 510) may be the same or different. The rotation of the visual content may be static (e.g., rotation in the same direction, same speed) or may be dynamic (e.g., rotation in different directions during the rotation, rotation at different speed during the rotation).

During the rotations of the visual content A 500 and the visual content B 510, the display 14 may change from presenting extents of the visual content A 500 within the display field of view 520 to extents of the visual content B 510 within the display field of view 520. For example, the display 14 may change the presentation between the visual content A 500 to the visual content B 510 after the visual content A 500 has made half of the rotation of the transition motion 530. Such transition in presentation of visual content from the visual content A 500 to the visual content B 510 may simulate lateral rotation of the display field of view 520 to the opposite of the original viewing direction (e.g., moving the viewing direction to the side to look at the other side, forcing the user to look to the side) with the displayed visual content being changed half way through the rotation.

In some implementations, a blurring effect (e.g., global blur, motion blur, radial blur) and/or other effects may accompany the rotation of the visual content within the spherical space. For example, as the visual content A 600 rotates laterally, the visual content A 600 may become progressively more blurry until it blurs into the visual content B 510 (which is also rotating laterally), which then progressively becomes less blurry until the visual content B 510 is shown without blurring (e.g., before or when the display field of view 520 is centered on the point B-1 512/when the transition motion 530 has stopped). Other visual effects (e.g., zoom effects, color/brightness/contrast effects) that accompany the transition motion are contemplated.

Figure 6A:
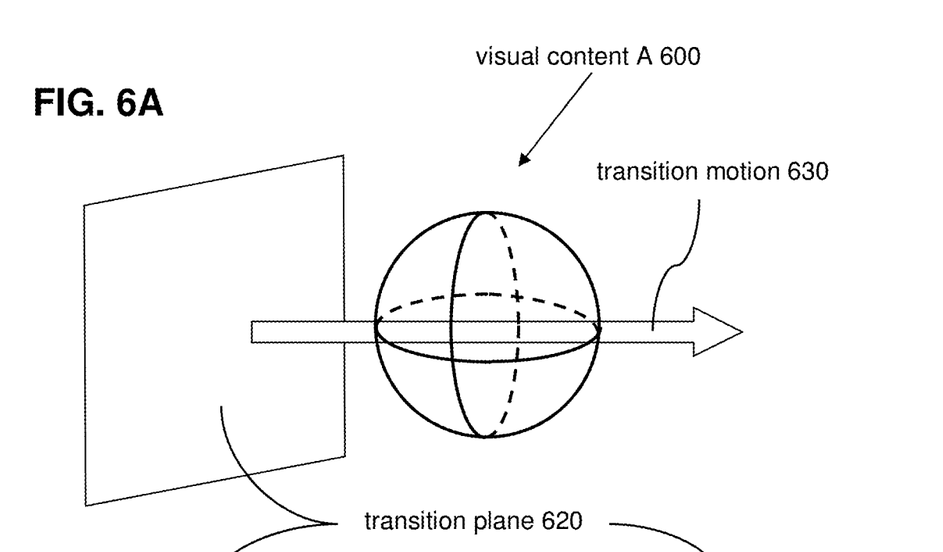
FIG. 6A illustrates an example transition motion of an example transition plane.
Figure 6B:
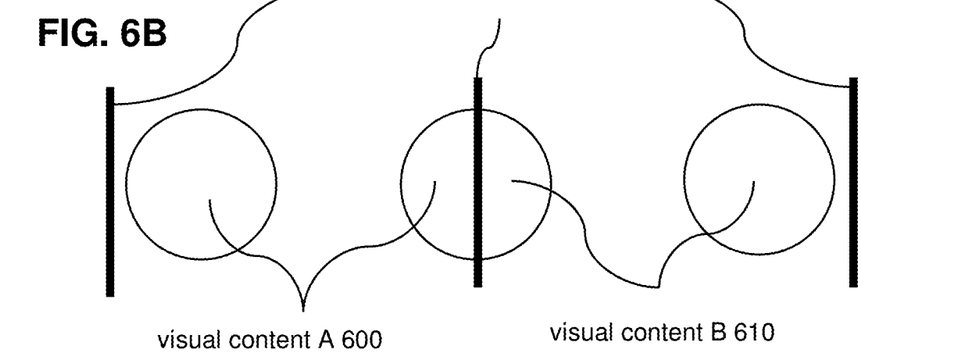
FIG. 6B illustrates an example transitioning of presentation between spherical visual content based on the example transition motion shown in FIG. 6A.

FIGS. 6A-6B illustrate an example transition motion 630 of an example transition plane 620 for transitioning presentation between visual content A 600 and visual content B 610. The presentation of visual content on the display 14 may change from the visual content A 600 to the visual content B 610. The change in the presentation of the visual content A 600 on the display 14 to the presentation of the visual content B 610 on the display 14 may be effectuated based on the transition motion 630 of the transition plane 620 within the spherical space. The transition motion 630 of the transition plane 620 within the spherical space may include a movement of the transition plane 620 through the visual content A 600/the spherical space. The presentation of the visual content on the display 14 may change from the visual content A 600 to the visual content B 610 as the transition plane 620 moves through the visual content A 600/the spherical space. The transition motion 630 of the transition plane 620 may provide a panning plane transition, where the transition plane 620 separates the presentation of the visual content A 600 and the visual content B 610 on the display 14. While the transition plane 620 is shown to be flat and moving horizontally in FIG. 6A, this is merely as an example and is not meant to be limiting. Other shapes and movements of a transition plane are contemplated.

FIG. 6B illustrates an example transitioning of presentation between the visual content A 600 and the visual content B 610 based on the example transition motion 630 shown in FIG. 6A. When the transition plane 620 has not entered the visual content A 600/the spherical space, the visual content presented on the display 14 may include the visual content A 600. When the transition plane 620 has moved halfway through the visual content A 600/the spherical space, the visual content presented on the display 14 may include the visual content A 600 and the visual content B 610, with the visual content B 610 present in the portions of the visual content A 600/the spherical space through which the transition plane 620 has passed. When the transition plane 620 has moved through the visual content A 600/the spherical space, the visual content presented on the display 14 may include the visual content B 610.

In some implementations, a blurring effect (e.g., global blur, motion blur, radial blur) and/or other effects may accompany the motion of the transition plane 620 within the spherical space. For example, the intersection of the transition plane 620 with the visual content A 600/the visual content B 610/the spherical space may be blurred to create a panning plane that blurs the transition between the visual content A 600 and the visual content B 610. The motion of the transition plane 620 may be accompanied by a trailing blur and/or lighting/contrast effects (e.g., darkening effect) to guide a user's viewing to a particular portion/spot within the visual content. Other visual effects that accompany the transition motion of a transition plane are contemplated.

Figure 7A:
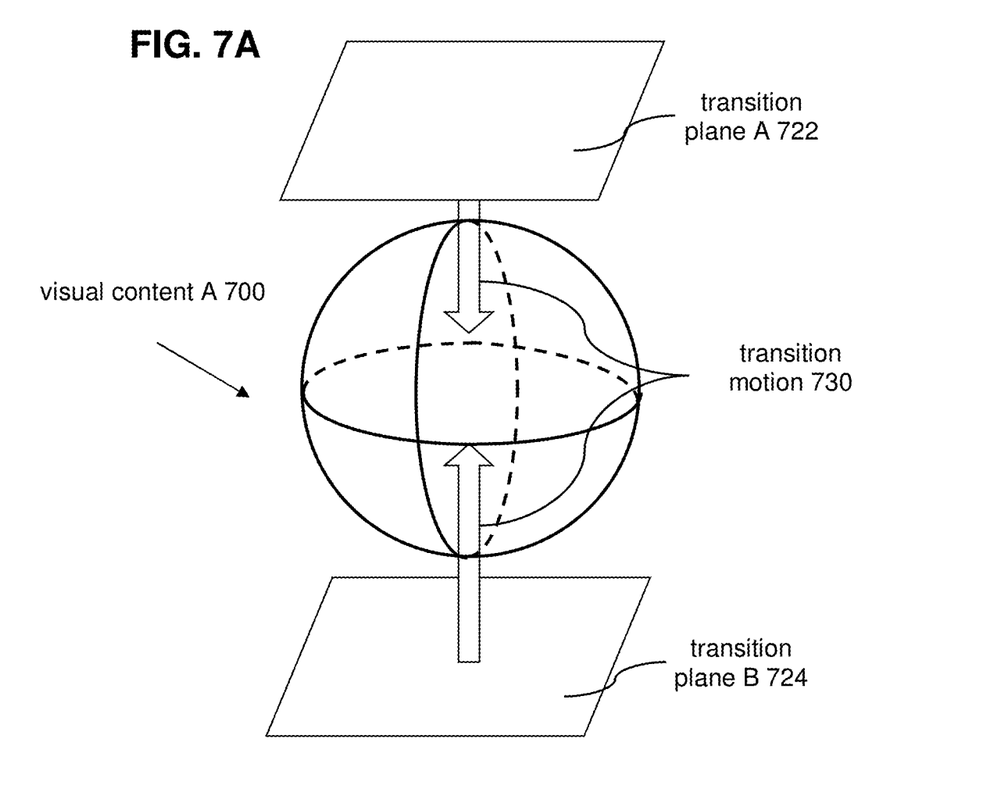
FIG. 7A illustrates an example transition motion of example transition planes.
Figure 7B:
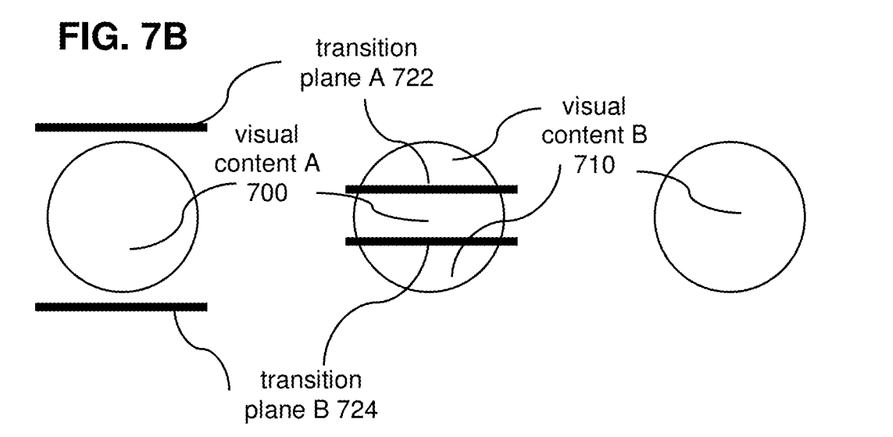
FIG. 7B illustrates an example transitioning of presentation between spherical visual content based on the example transition motion shown in FIG. 7A.

FIGS. 7A-7B illustrate an example transition motion 730 of example transition plane A 722 and transition plane B 724 for transitioning presentation between visual content A 700 and visual content B 710. The presentation of visual content on the display 14 may change from the visual content A 700 to the visual content B 710. The change in the presentation of the visual content A 700 on the display 14 to the presentation of the visual content B 710 on the display 14 may be effectuated based on the transition motion 730 of the transition planes 722, 724 within the spherical space. The transition motion 730 of the transition planes 722, 724 within the spherical space may include a movements of the transition planes 722, 724 through the visual content A 700/the spherical space. The presentation of the visual content on the display 14 may change from the visual content A 700 to the visual content B 710 as the transition planes 722, 724 moves through the visual content A 700/the spherical space. The transition motion 730 of the transition planes 722, 724 may provide a dual-panning plane transition, where the transition planes 722, 724 separate the presentation of the visual content A 700 and the visual content B 710 on the display 14. While the transition planes 722, 724 are shown to be flat and moving vertically in FIG. 7A, this is merely as an example and is not meant to be limiting. Other shapes and movements of transition planes are contemplated.

FIG. 7B illustrates an example transitioning of presentation between the visual content A 700 and the visual content B 710 based on the example transition motion 730 shown in FIG. 7A. When the transition planes 722, 724 have not entered the visual content A 700/the spherical space, the visual content presented on the display 14 may include the visual content A 700. When the transition planes 722, 724 have moved partially through the visual content A 700/the spherical space, the visual content presented on the display 14 may include the visual content A 700 and the visual content B 710, with the visual content B 710 present in the portions of the visual content A 600/the spherical space through which the transition planes 722, 724 have passed. When the transition planes 722, 724 have moved through the visual content A 700/the spherical space (e.g., by meeting halfway through the visual content A 700/the spherical space), the visual content presented on the display 14 may include the visual content B 710.

In some implementations, a blurring effect (e.g., global blur, motion blur, radial blur) and/or other effects may accompany the motion of the transition planes 722, 724 within the spherical space. For example, the intersection of the transition planes 722, 724 with the visual content A 700/the visual content B 710/the spherical space may be blurred to create dual-panning planes that blur the transition between the visual content A 700 and the visual content B 710. The motion of the transition planes 722, 724 may be accompanied by a trailing blur and/or lighting/contrast effects (e.g., darkening effect) to guide a user's viewing to a particular portion/spot within the visual content. Other visual effects that accompany the transition motion of transition planes are contemplated.

In some implementation, the transition motion 730 may include a reverse motion, where the transition planes 722, 724 move in opposite direction after meeting within the visual content A 700/the spherical space. The passage of the transition planes 722, 724 in the direction shown in FIG. 7A may be accompanied by darkening of the visual content A 700. The transition between the visual content A 700 and the visual content B 710 may occur during the motion of the transition planes 722, 724 out of the visual content A 700/the spherical space. Such transition of presentation of the visual content A 700 and the visual content B 720 may simulate a blinking-eye transition, where the view of the visual content A 700 darkens as the "eye" is closed (movement of the transition planes 722, 724 into the visual content A 700/spherical space), and the view of the visual content B 710 is presented as the "eye" is opened (movement of the transition planes 722, 724 out of the visual content A 700/spherical space).

Figure 8A:
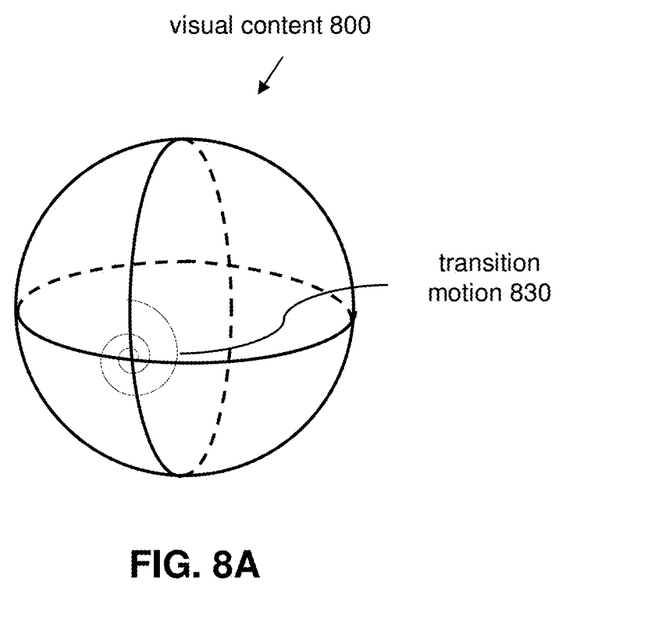
FIG. 8A illustrates an example transition motion including an example swirling warp.

FIG. 8A illustrates an example transition motion 830 including an example swirling warp for transitioning presentation between visual content 800 and another visual content. The presentation of visual content on the display 14 may change from the visual content 800 to the other visual content. The change in the presentation of the visual content 800 on the display 14 to the presentation of the other visual content on the display 14 may be effectuated based on the transition motion 830 including the swirling warp. The swirling warp may separate the presentation of the visual content 800 and the other visual content on the display 14. A swirling warp may blend the presentation of the visual content 800 and the other visual content on the display 14, such that the location of the warp including blending (e.g., blurring) of the video content 800 and the other video content. As the swirling warp moves through the visual content 800/the spherical space (e.g., changes size, cover different portions of the visual content 800/the spherical space), the presentation of the visual content may be changed between the visual content 800 and the other visual content.

Figure 8B:
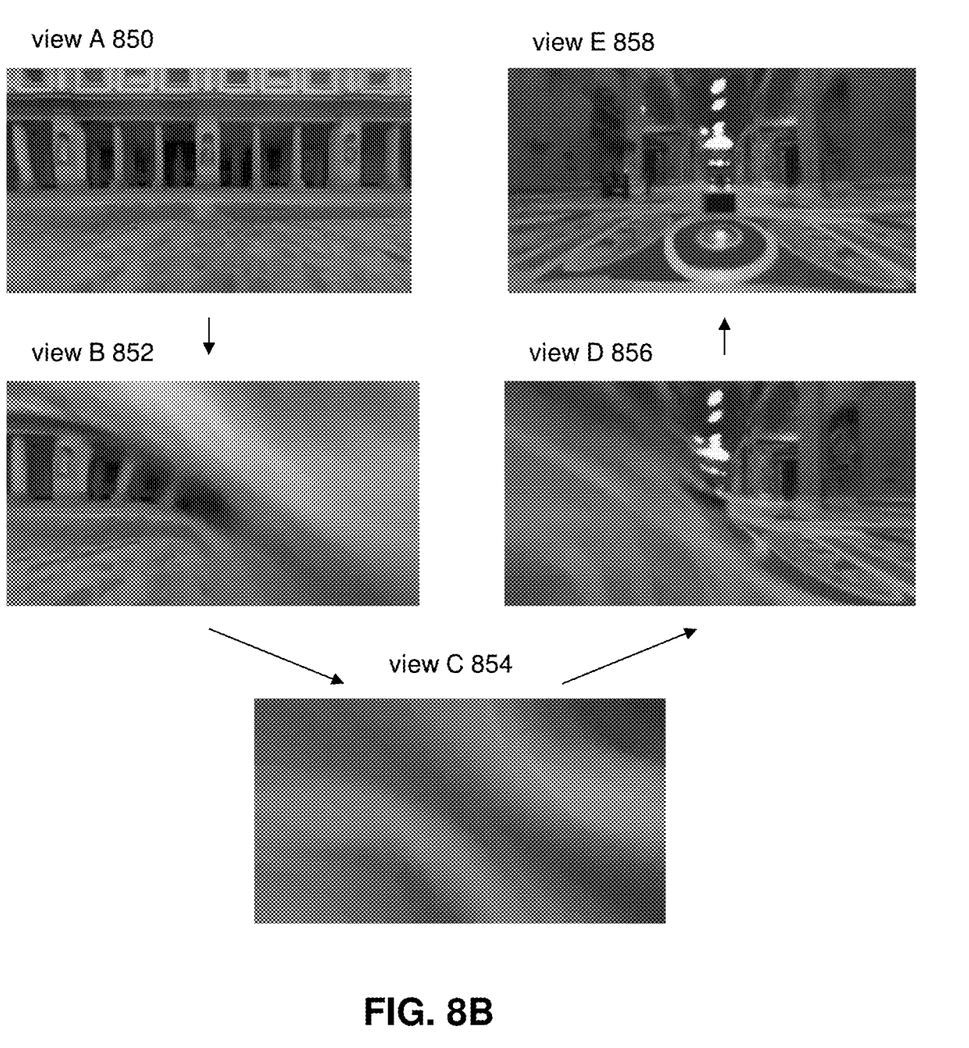
FIG. 8B illustrates example views of transitioning of presentation between spherical visual content based on the example transition motion shown in FIG. 8A.

FIG. 8B illustrates example views (e.g., within a display field of view) of transitioning of presentation between the visual content 800 and the other visual content based on the example transition motion 830 shown in FIG. 8A. The movement of the swirling warp through the visual content 800/spherical space may cause the display field of view to change from including extents of the visual content 800, to a mixture of extents of the visual content 800 and the other visual content, to extents of the other visual content. For example, view A 850 may provide a view of a portion of the visual content 800. View B 852 may provide a view of the swirling warp moving into the extent of the visual content 800 covered by the display field of view. View C 854 may provide a view of a mixture (e.g., blending, blurring) of extents of the visual content 800 and the other visual content. View D 856 may provide a view of the swirling warp moving out of the extent of the visual content 800 covered by the display field of view. View E 858 may provide a view of a portion of the visual content 810.

In some implementations, the swirling warp shown in FIG. 8A may move back and forth through the spherical visual content/spherical space, which each motion through the spherical visual content/spherical space causing changes in presentation of the visual content (e.g., from a first visual content to a second visual content, and then from the second visual content to the first visual content, and so forth).

In some implantations, a transition motion may include other types of warping/visual effects. For example, a transition motion may include a warping that stimulates a view of a water drop effect that transitions presentation between visual content. Other types of warping/visual effects are contemplated.

The spherical transition component 108 may be configured to effectuate one or more changes in the presentation of visual content on the display 14 based on the spherical transition and/or other information. For example, the spherical transition component 108 may be configured to effectuate one or more changes in the presentation of the first spherical visual content on the display 14 to presentation of the second spherical visual content on the display 14 based on the spherical transition and/or other information. The change(s) in the presentation on the display 14 may be determined based on the transition motion within the spherical space and/or other information. For example, the spherical transition component 108 may effectuate one or more changes in the presentation of visual content on the display 14 based on the transition motions shown in FIGS. 5, 6A, 7A, and 8A. Other changes based on other transition motions are contemplated.

The change(s) to the presentation of the visual content on the display 14 may be effectuated by changes to the visual content within the spherical space. Because the changes (e.g., transformation) to the visual content are made in the spherical space (as opposed to screen space in classical visual transitions), the changes may be made agnostic of the source visual projection. Because the changes to the visual content are made in the spherical space, the projection used to view the visual content may not affect the changes/transformations.

Using changes to the visual content within the spherical space for visual content transition may enable use of visual transitions that are not available using changes within the screen space and/or may provide new/additional uses of visual transitions used within the screen space. For example, using changes to the visual content within the spherical space may enable use of transition motions, such as those shown in FIGS. 5, 6A, 7A, and 8A, to effectuate changes in presentation of visual content.

Using changes to the visual content within the spherical space may enable provision of better visuals than visual transitions using changes within the screen space. For example, a blur transition may blur the presentation of one visual content into another (e.g., a first visual content becomes progressively more blurry until it blurs into a second visual content, which then progressively becomes less blurry until the second visual content is shown without blurring). Using a blur transition within screen space (e.g., visuals presented within display field of view) may result in worse blurring at/near the edges of the screen space compared to blurring at the center of the screen space. Blurring may use pixels around the blurring point to create the blurring effect. There may be sufficient number/amount of pixels around the center of the screen space to blur the pixel at the center of the screen space. However, at/near the edges of the screen space, there may not be as many pixels around the pixel to be blurred. For example, a pixel at the left edge of the screen space may not have any pixels to the left to be used for blurring. The fewer number/amount or lack of pixels available for blurring may cause visual defects/artifacts in blurring at/near edges of the screen space.

Within the spherical space, different pixels may not have fewer number/amount of pixels available for blurring than other pixels. The visual content within the spherical space may include pixels (e.g., over-capture) beyond those within the display field of view (within the screen space). Blurring within the spherical space may use pixels not within the display field of view/screen space to blur the visual content, and provide for better blurring effect (e.g., not have visual defects/artifacts due to lack of available pixels at/near the edges of display field of view).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although the processor 11 and the electronic storage 12 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
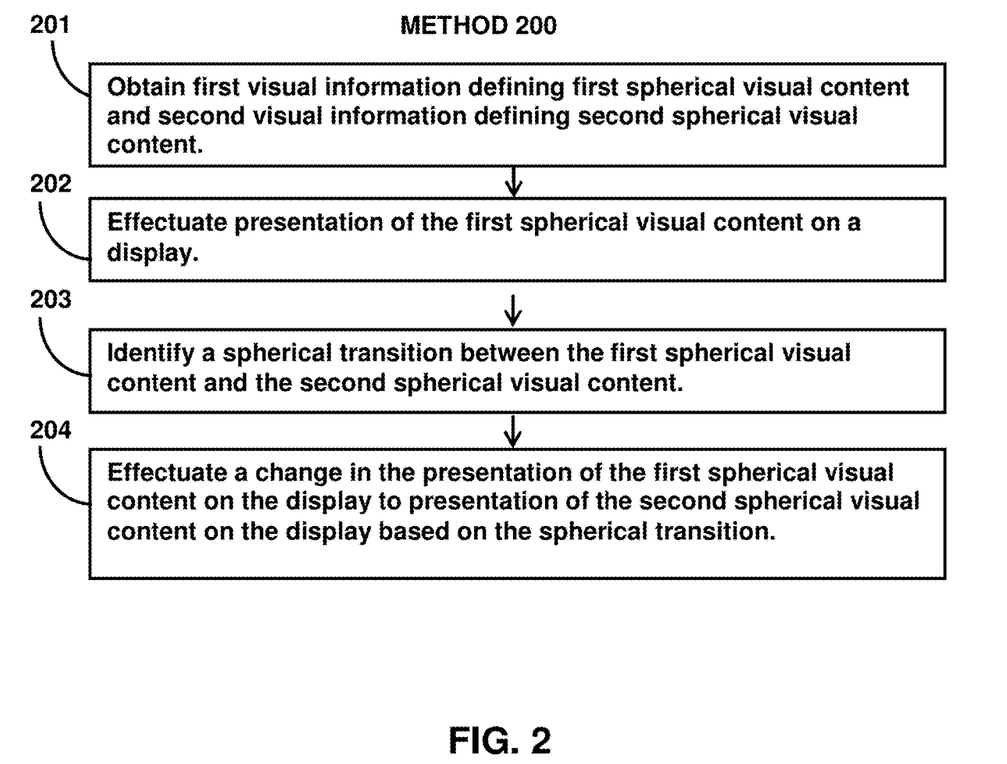
FIG. 2 illustrates a method for transitioning presentation between spherical visual content.

FIG. 2 illustrates method 200 for indicating highlights within spherical videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, first visual information defining first spherical visual content and second visual information defining second spherical visual content may be obtained. In some implementation, operation 201 may be performed by a processor component the same as or similar to the visual information component 102 (Shown in FIG. 1 and described herein).

At operation 202, presentation of the first spherical visual content on a display may be effectuated. In some implementations, operation 202 may be performed by a processor component the same as or similar to the presentation component 104 (Shown in FIG. 1 and described herein).

At operation 203, a spherical transition between the first spherical visual content and the second spherical visual content may be identified. The spherical transition may define a change in presentation of visual content on the display from the first spherical visual content to the second spherical visual content based on a transition motion within a spherical space. In some implementations, operation 203 may be performed by a processor component the same as or similar to the identification component 106 (Shown in FIG. 1 and described herein).

At operation 204, a change in the presentation of the first spherical visual content on the display to presentation of the second spherical visual content on the display may be effectuated based on the spherical transition. The change may be determined based on the transition motion within the spherical space. In some implementations, operation 204 may be performed by a processor component the same as or similar to the spherical transition component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that transitions presentation between spherical visual content, the system comprising:
one or more physical processors configured by machine-readable instructions to:
obtain first visual information defining first spherical visual content of a first spherical image or a first spherical video;
obtain second visual information defining second spherical visual content of a second spherical image or a second spherical video;
effectuate presentation of the first spherical visual content on a display, wherein an extent of the first spherical visual content presented on the display is defined by a display field of view, a viewing direction characterizing a direction in which the display field of view is directed at the first spherical visual content;
identify a spherical transition between the first spherical visual content and the second spherical visual content, the spherical transition defining a change in presentation of visual content on the display from the first spherical visual content to the second spherical visual content based on a transition motion within a spherical space, the spherical space including a single sphere, surface of the single sphere representing viewable portions of both the first spherical visual content and the second spherical visual content, wherein the transition motion takes into account spherical dimensionality of the spherical space and includes a motion of a transition plane through the single sphere independent of the viewing direction of the display field of view, the transition plane separating the presentation of the first spherical visual content and the second spherical visual content on the display such that a first portion of the surface of the single sphere on a first side of the transition plane includes the presentation of the first spherical visual content of the first spherical image or the first spherical video and a second portion of the surface of the single sphere on a second side of the transition plane includes the presentation of the second spherical visual content of the second spherical image or the second spherical video, the second side of the transition plane being opposite from the first side of the transition plane, further wherein presentation on the display includes simultaneous presentation of a portion of the first spherical visual content of the first spherical image or the first spherical video and a portion of the second spherical visual content of the second spherical image or the second spherical video based on the transition plane being located within the display field of view, the portion of the first spherical visual content and the portion of the second spherical visual content separated by the transition plane within the presentation on the display; and effectuate a change in the presentation of the first spherical visual content on the display to presentation of the second spherical visual content on the display based on the spherical transition, the change determined based on the transition motion within the spherical space and independent of the viewing direction of the display field of view.

2. The system of claim 1, wherein the spherical transition is identified based on a director track including the spherical transition.

3. The system of claim 1, wherein the spherical transition is identified based on a user selection of the spherical transition.

4. The system of claim 1, wherein the transition motion within the spherical space further includes a rotation of the first spherical visual content independent of the viewing direction of the display field of view and a rotation of the second spherical visual content independent of the viewing direction of the display field of view within the spherical space.

5. The system of claim 1, wherein a blurring effect accompanies the motion of the transition plane within the spherical space.

6. The system of claim 1, wherein the transition motion within the spherical space further includes a change in projection.

7. The system of claim 1, wherein the transition motion within the spherical space further includes a swirling warp independent of the viewing direction of the display field of view, the swirling warp blending the presentation of the first spherical visual content and the second spherical visual content on the display.

8. A method for transitioning presentation between spherical visual content, the method performed by a computing system including one or more physical processors, the method comprising:

obtaining, by the computing system, first visual information defining first spherical visual content of a first spherical image or a first spherical video;

obtain, by the computing system, second visual information defining second spherical visual content of a second spherical image or a second spherical video;

effectuating, by the computing system, presentation of the first spherical visual content on a display, wherein an extent of the first spherical visual content presented on the display is defined by a display field of view, a viewing direction characterizing a direction in which the display field of view is directed at the first spherical visual content;

identifying, by the computing system, a spherical transition between the first spherical visual content and the second spherical visual content, the spherical transition defining a change in presentation of visual content on the display from the first spherical visual content to the second spherical visual content based on a transition motion within a spherical space, the spherical space including a single sphere, surface of the single sphere representing viewable portions of both the first spherical visual content and the second spherical visual content, wherein the transition motion takes into account spherical dimensionality of the spherical space and includes a motion of a transition plane through the single sphere independent of the viewing direction of the display field of view, the transition plane separating the presentation of the first spherical visual content and the second spherical visual content on the display such that a first portion of the surface of the single sphere on a first side of the transition plane includes the presentation of the first spherical visual content of the first spherical image or the first spherical video and a second portion of the surface of the single sphere on a second side of the transition plane includes the presentation of the second spherical visual content of the second spherical image or the second spherical video, the second side of the transition plane being opposite from the first side of the transition plane, further wherein presentation on the display includes simultaneous presentation of a portion of the first spherical visual content of the first spherical image or the first spherical video and a portion of the second spherical visual content of the second spherical image or the second spherical video based on the transition plane being located within the display field of view, the portion of the first spherical visual content and the portion of the second spherical visual content separated by the transition plane within the presentation on the display; and effectuating, by the computing system, a change in the presentation of the first spherical visual content on the display to presentation of the second spherical visual content on the display based on the spherical transition, the change determined based on the transition motion within the spherical space and independent of the viewing direction of the display field of view.

9. The method of claim 8, wherein the spherical transition is identified based on a director track including the spherical transition.

10. The method of claim 8, wherein the spherical transition is identified based on a user selection of the spherical transition.

11. The method of claim 8, wherein the transition motion within the spherical space further includes a rotation of the first spherical visual content independent of the viewing direction of the display field of view and a rotation of the second spherical visual content independent of the viewing direction of the display field of view within the spherical space.

12. The method of claim 8, wherein a blurring effect accompanies the motion of the transition plane within the spherical space.

13. The method of claim 8, wherein the transition motion within the spherical space further includes a change in projection.

14. The method of claim 8, wherein the transition motion within the spherical space further includes a swirling warp independent of the viewing direction of the display field of view, the swirling warp blending the presentation of the first spherical visual content and the second spherical visual content on the display.

15. A system that transitions presentation between spherical visual content, the system comprising:

one or more physical processors configured by machine-readable instructions to:

obtain first visual information defining first spherical visual content of a first spherical image or a first spherical video;

obtain second visual information defining second spherical visual content of a second spherical image or a second spherical video;

effectuate presentation of the first spherical visual content on a display, wherein an extent of the first spherical visual content presented on the display is defined by a display field of view, a viewing direction characterizing a direction in which the display field of view is directed at the first spherical visual content;

identify a spherical transition between the first spherical visual content and the second spherical visual content, the spherical transition defining a change in presentation of visual content on the display from the first spherical visual content to the second spherical visual content based on a transition motion within a spherical space, the spherical space including a single sphere, surface of the single sphere representing viewable portions of both the first spherical visual content and the second spherical visual content, wherein the transition motion within the spherical space takes into account spherical dimensionality of the spherical space and includes a rotation of the first spherical visual content independent of the viewing direction of the display field of view and a rotation of the second spherical visual content independent of the viewing direction of the display field of view within the spherical space, a motion of a transition plane through the single sphere independent of the viewing direction of the display field of view, and a swirling warp independent of the viewing direction of the display field of view, the transition plane separating the presentation of the first spherical visual content and the second spherical visual content on the display such that a first portion of the surface of the single sphere on a first side of the transition plane includes the presentation of the first spherical visual content of the first spherical image or the first spherical video and a second portion of the surface of the single sphere on a second side of the transition plane includes the presentation of the second spherical visual content of the second spherical image or the second spherical video, the second side of the transition plane being opposite from the first side of the transition plane, further wherein presentation on the display includes simultaneous presentation of a portion of the first spherical visual content of the first spherical image or the first spherical video and a portion of the second spherical visual content of the second spherical image or the second spherical video based on the transition plane being located within the display field of view, the portion of the first spherical visual content and the portion of the second spherical visual content separated by the transition plane within the presentation on the display, and the swirling warp blending the presentation of the first spherical visual content and the second spherical visual content on the display; and effectuate a change in the presentation of the first spherical visual content on the display to presentation of the second spherical visual content on the display based on the spherical transition, the change determined based on the transition motion within the spherical space and independent of the viewing direction of the display field of view.

16. The system of claim 15, wherein a blurring effect accompanies the motion of the transition plane within the spherical space.

* * * * *